United States Patent [19]

Smith

[11] Patent Number: 4,579,647

[45] Date of Patent: Apr. 1, 1986

[54] MULTIPHASE CATALYTIC PROCESS WITH IMPROVED LIQUID DISTRIBUTION

[75] Inventor: Fritz A. Smith, Rye, N.Y.

[73] Assignee: Mobil Oil Corporation, New York, N.Y.

[21] Appl. No.: 732,021

[22] Filed: May 8, 1985

Related U.S. Application Data

[62] Division of Ser. No. 434,664, Oct. 15, 1982.

[51] Int. Cl.$^4$ .............................................. C10G 47/16
[52] U.S. Cl. .................................... 208/111; 208/146; 208/108; 422/220
[58] Field of Search ................ 422/220; 208/107, 108, 208/146, 147, 111

[56] References Cited

U.S. PATENT DOCUMENTS

| | | | |
|---|---|---|---|
| 1,780,101 | 10/1930 | Wagner | 55/187 |
| 2,860,955 | 11/1958 | Kassel | 422/220 |
| 3,003,580 | 10/1961 | Lanning | 55/46 |
| 3,218,249 | 11/1965 | Ballard et al. | 422/211 |
| 3,479,146 | 11/1969 | Hochman et al. | 422/220 |
| 3,591,345 | 7/1971 | Hochman et al. | 422/220 |
| 3,685,971 | 8/1972 | Carson | 422/220 |
| 3,787,188 | 1/1974 | Lyon | 422/220 |
| 3,824,081 | 7/1974 | Smith et al. | 422/220 |
| 4,126,539 | 11/1978 | Derr, Jr. et al. | 422/212 |
| 4,229,282 | 10/1980 | Peters et al. | 208/111 |

FOREIGN PATENT DOCUMENTS

0641379  5/1962  Canada .............................. 208/146

*Primary Examiner*—John Doll
*Assistant Examiner*—Lance Johnson
*Attorney, Agent, or Firm*—A. J. McKillop; M. G. Gilman; L. G. Wise

[57] ABSTRACT

A fixed bed catalytic reactor having a porous bed of catalyst particles contained in a closed reactor shell, comprising inlet means for introducing a downwardly flowing mixed stream of gas and liquid reactants;

phase separator means for receiving said mixed stream and directing liquid onto the porous catalyst bed, said separator means being disposed within the reactor shell between said inlet means and said porous catalytic bed;

said separator means comprising an upper foraminous wall having a series of gas outlets permitting a substantially-gaseous phase to escape outwardly from the separator means into an upper reactor portion, and lower liquid distribution means for receiving a stream of substantially liquid phase and dividing said liquid phase into a plurality of spaced-apart liquid streams directed toward the porous catalyst bed; and means for recovering gaseous and liquid reaction products from the reactor shell.

The phase separator-distributor is particularly useful for retrofitting a reactor to accommodate mixed flow without requiring welding internal structures onto the reactor shell. In a petrochemical complex, such separation and distribution system is advantageous in converting a reactor system for hydrotreating of a hydrocarbon distillate, such as dewaxing.

13 Claims, 6 Drawing Figures

MULTIPHASE CATALYTIC PROCESS WITH IMPROVED LIQUID DISTRIBUTION

This is a division of copending application Ser. No. 434,664, filed on Oct. 15, 1982.

BACKGROUND OF THE INVENTION

1. Field of the Invention

This process relates to catalytic reactors having cocurrent multiphase reactant feed. In particular, it relates to methods and apparatus for separating liquid and gaseous phases and distributing the reactant downflow uniformly onto a bed of catalyst particles.

2. Background of the Invention

In the treatment of hydrocarbons or other organic materials in a petroleum refinery or petrochemical complex, various catalytic processes are employed; for instance, hydrocracking with zeolite catalyst, hydrodesulfurization with Co, Ni and/or Mo catalysts, etc. Often, these processes are carried out in a fixed bed reactor, with multi-phase reactant feedstock mixtures being introduced at an upper reactor inlet for downward co-current flow over the catalyst bed.

In prior reactors, distribution of liquid has been achieved with a horizontal tray or the like mounted within the reactor shell, with perforations, weirs, or multiple conduits for uniformly spreading the liquid over the catalyst bed.

A typical reactor shell used in this invention advantageously has a cylindrical configuration with vertical axial flow; although other reactors may also be employed, such as elongated polygonal or spheroidal shells. Pressure vessels of the type employed in catalytic hydrogenation processes usually must withstand superatmospheric pressures, and thus, are constructed to withstand internal pressures of several atmospheres up to hundreds, depending upon the desired partial pressure of reactant gas. A typical hydrogenation reactor may be constructed of welded 304 stainless, carbonsteel or the like.

Retrofitting of catalytic reactions is desirable when a chemical manufacturing complex is altered to accommodate different processes. Many general-purpose pressurized reactors are constructed of welded steel with a length:diameter ratio (L:D) of about 2:1 to 10:1, preferably 4:1 to 6:1. These reactors may be enclosed at top and bottom with bolted on welded hemispheroidal end sections. Fluid inlet and outlet ports, maintenance access holes, and other openings for piping, instrumentation, etc. are provided.

Input gas and liquid reactants may be introduced at the top of the reactor in a mixed stream through a simple inlet conduit, and flow downwardly through the porous reactor bed. In order to maintain homogenous flow throughout the horizontal cross-sectional reactor area, the reactants are distributed over the surface of the catalyst bed. In some prior art reactors, such as disclosed in U.S. Pat. No. 4,126,539 (Derr et al) or in U.S. Pat. No. 3,218,249 (Ballard et al), a distributor tray is mounted over the catalyst bed for receiving vapor and liquid reactants for distribution. While internal arrangements of this type may be satisfactory for original equipment installations, they are difficult to install in pre-existing reactor shells. This difficulty is due to weakening of the reactor shell during welding or other installation techniques. Although it is technically possible to field weld internal distributor components and anneal the structure to retain integrity of the pressure vessel, such modifications are expensive and time-consuming.

Reactor modifications for petrochemical plants may require altering a single-phase system for multi-phase processes or other internal structural changes and/or repiping. Such modifications to existing equipment may expedite process changeover or decrease cost on a new process installation. Known flow nozzle designs are adequate for single phase liquid or gas distribution or when high pressure drop is permissible. However, it has been found that low pressure drop distributors for mixed gas and liquid feedback in cocurrent reactors are extremely difficult to install.

SUMMARY OF THE INVENTION

An improved reactant flow distributor system has been designed for co-current downflow catalytic reactors. This is especially adapted for retrofit installation in a pre-existing vertical reactor shell having top access.

This system is particularly advantageous in processes for hydrotreating a hydrocarbon stream in a fixed bed catalytic reactor having a porous bed of catalyst particles contained in a closed reactor shell. A technique has been provided for introducing a downwardly flowing mixed stream of vapor and liquid; receiving the mixed stream in a phase separator and directing liquid uniformly onto the catalyst bed, the separator being disposed within the reactor shell between the inlet means and porous catalytic bed; permitting a substantially-gaseous phase to escape outwardly from the separator through an upper foraminous wall having a plurality of gas outlets into an upper reactor portion; receiving a stream of substantially liquid phase in a lower portion of the phase separator; dividing the liquid phase into a plurality of spaced-apart liquid streams directed toward the catalyst bed; converting the liquid by catalytic reaction with the gas in contact with the catalyst; and recovering gaseous and liquid reaction products from the reactor.

DETAILED DESCRIPTION

Figure 1:
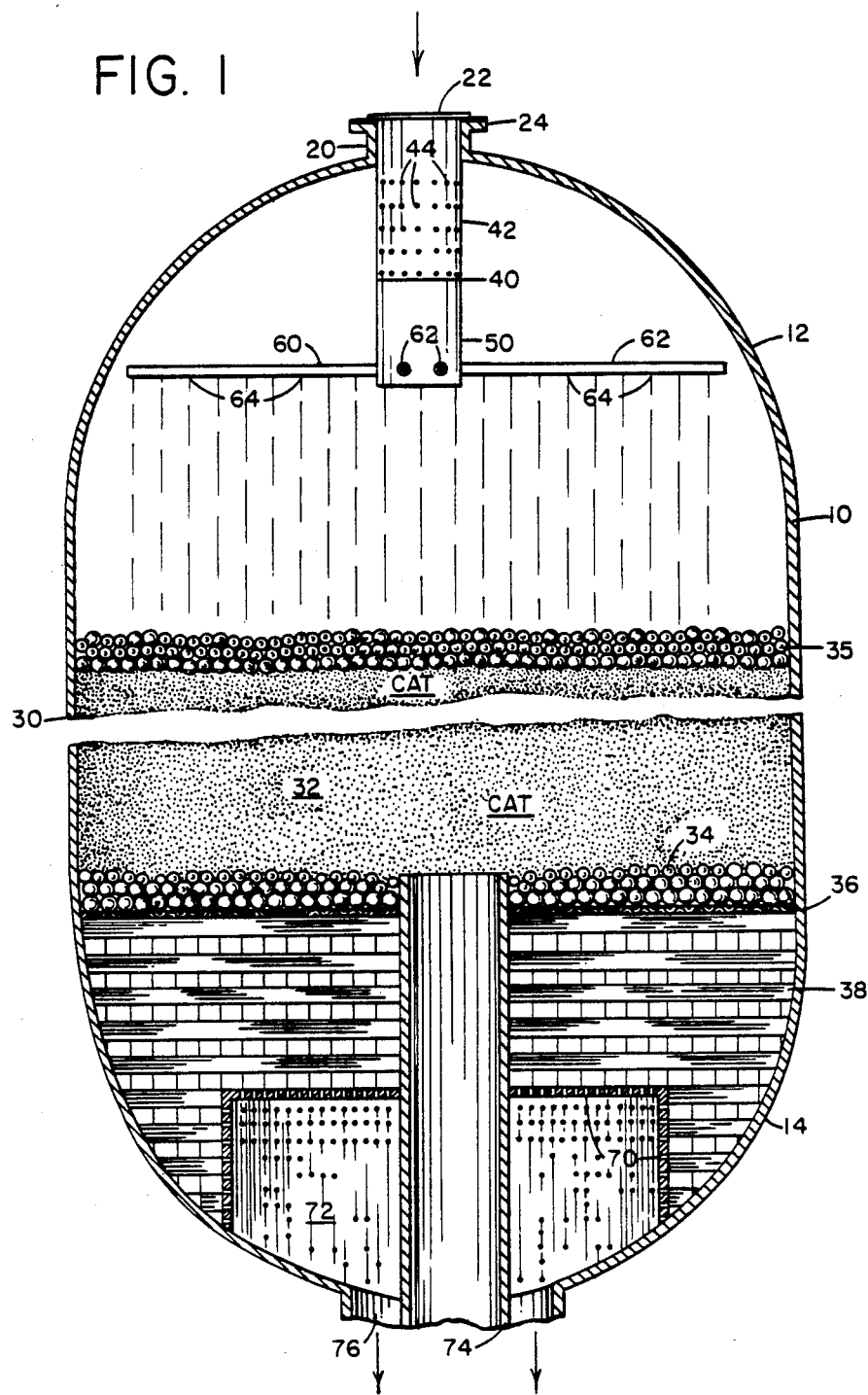
FIG. 1 is a vertical cross-section view of a catalytic reactor showing the novel phase separator in side view.

A typical reactor system used for catalytic conversion in the petrochemical or refining industries is shown in FIG. 1, including a steel reactor shell 10 in the form of a vertical cylinder having hemispherical top and bottom closure portions 12, 14.

Inlet 20 provides means for introducing a multi-phase gas-liquid reactant feed downwardly from a feed conduit. The top access port 22 is provided with a flanged mounting means for attaching the feed conduit and phase separator, as later described.

The middle reactor portion 30 comprises a fixed bed 32 of catalyst particles, such as spherical beads, extrudate, polylobal shapes, etc.

In the specific arrangement of FIG. 1 presented as an example, the bed of catalyst 32 comprising ZSM-5/alumina is supported by a combination of ceramic balls 34 comprising a bottom layer of large balls, a middle layer of intermediate size balls and a top layer of small balls above grid 36 and grid means 38 above a perforated baffle product withdrawal means 70 about product collecting chamber 72. Conduit 74, coaxially positioned within the lower portion of reactor 10 extends downwardly from the upper or bottom level of the ceramic balls to a point beneath the vessel to provide means for emptying the reactor of catalyst and ceramic balls. During operation this may be filled with inert material to prevent catalyst movement, and is sealed to prevent passage of liquid and vapors during operation.

Annular chamber 72 formed by perforated cylindrical baffle 70 with a top annular closure is sized and arranged with respect to layers of grid support members to minimize inherent pressure drop differences in the flow of materials from various radiating sections of the catalyst bed to the central product accumulating withdrawal chamber. The annular chamber is connected to a product withdrawal conduit 76, partially shown, for passage of the product to product separation equipment (not shown).

The ceramic ball arrangement referred to above and comprising at least three different ball sizes, supports a bed of catalyst thereabove comprising layers of catalyst varying in particle size. A top layer of inert ceramic balls 35 is employed to achieve substantially uniform fluid distribution across the horizontal area of the reactor and to hold the catalyst particles 32 in place.

The phase separator means 40 shown in FIG. 1 includes an upper portion 42 adapted to be attached concentrically below the inlet means 20 to the mounting ring 24. The upper separator portion 42 has a series of gas outlets 44 disposed in spaced array around the circumference of a cylindrical foraminous wall, forming ports to permit a substantially-gaseous phase to escape outwardly from the separator means 40 into an upper portion of the reactor chamber.

The phase separator functions as a hollow receiver for receiving multi-phase feed. A lower liquid collector portion 50 is operatively connected between the upper gas escape portion and a liquid distribution means 60, as hereinafter described in greater detail.

Figure 2:
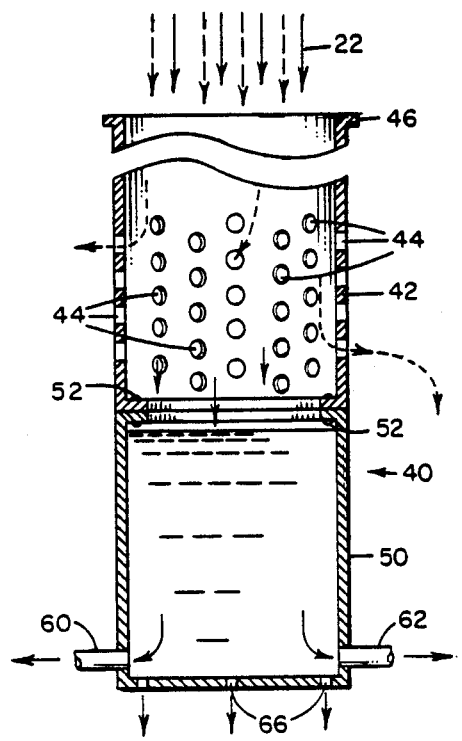
FIG. 2 is a vertical cross-section view of a preferred embodiment of the phase separator.

A more complete understanding of the phase separation device can be obtained by referring to FIG. 2, which depicts a mixed gas (dashed arrows) and liquid (solid arrows) feed entering from feed stream 22 into improved phase separator 40. This device can be constructed on a cylindrical sleeve-like internal structure having an upper retainer flange 46 for engagement with a mating section on the reactor mounting ring 24.

Figure 3:
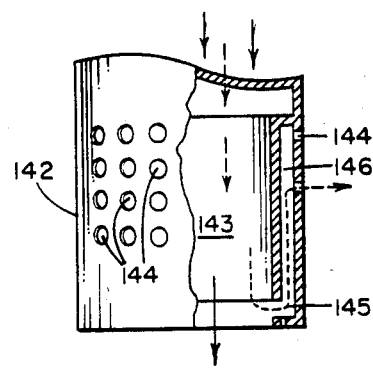
FIG. 3 is a partially cut-away side view of an alternative embodiment of an upper separator portion.

Substantially all of the liquid and part of the vapor phase materials pass from upper foraminous portion 60 downwardly into the lower liquid collector and distribution portion 50, which includes a solid cylindrical wall. The lower and upper portions may be integrally formed or fabricated in sections for field completion. The separator units shown in FIGS. 2 and 3 are made for bolting of the upper and lower portions by fastening means 52, which may comprise mating internal rims with spaced fastener holes.

Liquid accumulates in the lower collector, the upper level of which is determined by sizing of the liquid distribution system, hydrostatic head and pressure differential between the upper separator portion and the upper reactor chamber surrounding the phase separator.

Preferably, the liquid outlets and collector well bottom are spaced at least 1–2 pipe diameters below the lowermost gas outlet ports, providing an adequate separation zone while maintaining liquid head. Usually, the total gas escape port area is less than the cross-sectional area of the multi-phase feed inlet, preferably 50% to 100%. However, small gas content may indicate perhaps 25% gas escape area. In other cases, for instance, where a very large fraction of the feed is in the vapor phase and low pressure drop is desired, up to 150% open area may be employed.

The upper foraminous separator wall has a ratio of open area to closed area adequate to permit gas phase escape while maintaining a liquid substantially free of gas in the lower portion of the phase separator. The specific ratio employed in a particular system will accommodate the volumetric ratio of gas to total liquid in the mixed inlet stream.

Liquid flows under velocity and hydrostatic head from the lower portion of the phase separator, dividing into a plurality of streams for distribution at the top of the catalyst bed. A preferred liquid distribution means is a multi-conduit array 60, operatively mounted onto the phase separator 40 at the bottom thereof and in fluid communication with the separated liquid phase. Radial horizontal pipes 62 are supported in a "spider" pattern to deliver the liquid at spaced ports 64, which may be drilled along the length of each radial pipe.

Advantageously, the radial pipes 62 may be connected at their outer ends to a peripheral conduit, thereby forming a spoked wheel shape. This configuration provides additional structural support for the radial pipes and permits further liquid distribution through peripheral conduit ports. Additional ports 66 may be drilled in the flat bottom of the lower separator portion. Alternative liquid distribution devices are disclosed by Kassel in U.S. Pat. No. 2,860,955 and Harris et al in U.S. Pat. No. 3,791,525.

An alternative phase separator is shown in FIG. 3. In this embodiment, the upper foraminous wall 142 is separated from the inlet stream by an inner cylindrical sleeve 143, which directs the mixed gas and liquid feed downwardly past the gas escape ports toward the lower liquid collector portion (not shown). This configuration prevents sheeting of the liquid along the outer wall and enhances phase separation by preventing excess entrainment of liquid by gas flowing outwardly through escape ports 144. In this design the gas must reverse its direction of flow and enter through baffle opening 145 into annular chamber 146 prior to entering the upper reactor chambers. This embodiment is advantageous for mixtures containing a relatively lower gas to liquid ratio.

Figure 4:
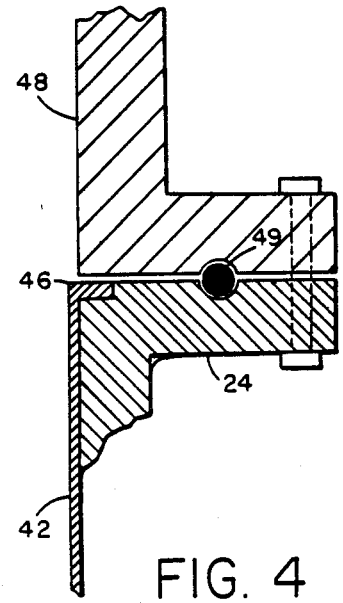
FIG. 4 is a detailed vertical cross-section view of a typical reactor mounting arrangement.

The detail shown in FIG. 4 depicts how the flanged upper separator 42, 46 fits into a recess in the mounting ring 24. A feed inlet pipe 48 is connected to the reactor and provided with O-ring seal 49 to prevent fluid loss. Bolted flanges are customarily used for such connection, to permit easy access for maintenance and installation.

Figure 5:
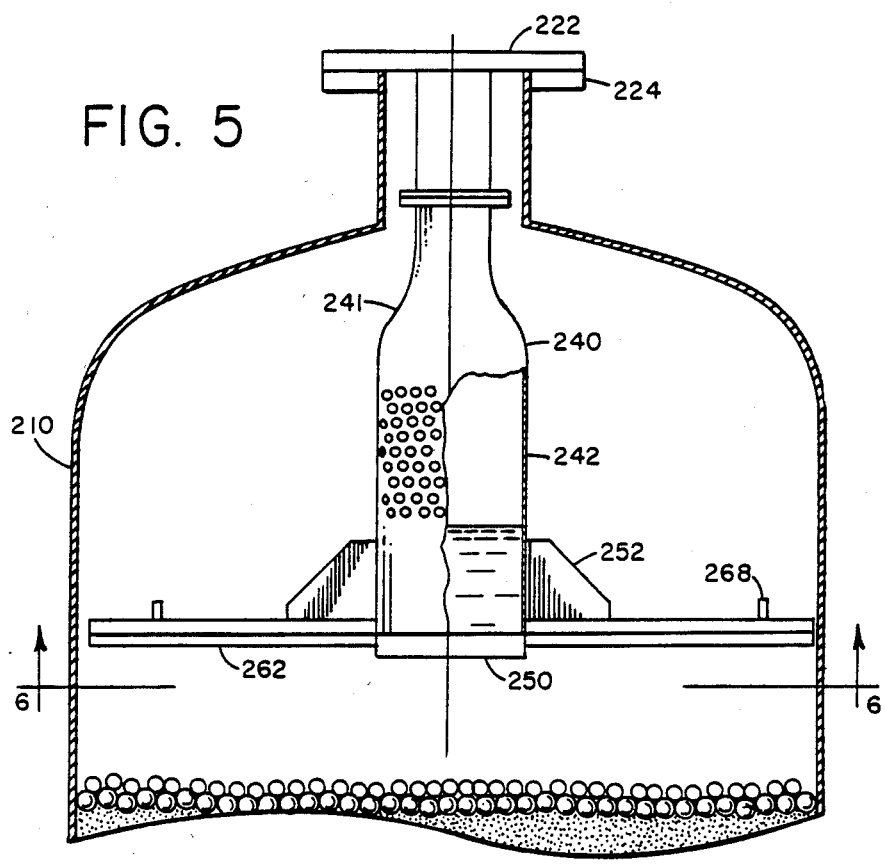
FIG. 5 is a vertical cross-section view of an upper portion of an alternative reactor and phase separator system.

In the embodiment shown in FIG. 5, the top end of a cylindrical reactor 210 is provided with a flanged center access opening 224. A mounting ring permits connection of a vertical inlet pipe 222 and provides a suitable means for mounting the phase separator 240 adjacent the inlet pipe and axially aligned therewith. The relative size and shape of the inlet pipe and upper phase separator portion are a matter of design choice; however, it is preferred that circular conduits be employed, with equal inside diameters or a non-turbulent outward flare throat section 241 intermediate the inlet pipe and upper phase separator portion 242. If a smaller inlet pipe is used, it can extend partially into a concentric phase separator, as in FIG. 3.

The system depicted in FIG. 5 is specifically designed for catalytic hydrodewaxing of petroleum distillate, such as fuel oil, kerosene, etc. Except as noted, it is substantially the same as the embodiment of FIGS. 1 and 2. The lower liquid collection portion 250 is operatively connected in fluid flow arrangement with liquid distributor 260. Six radial pipes 262 are threaded or welded onto the phase separator and may be reinforced by gusset members 252. Further structural integrity may be provided by attaching circular stiffener bar 268 to each distributor pipe 262 intermediate its length. Liquid distributor holes 264 may be drilled at spaced locations along each pipe with one to three holes being spaced apart (FIG. 6) at the bottom of each member.

Figure 6:
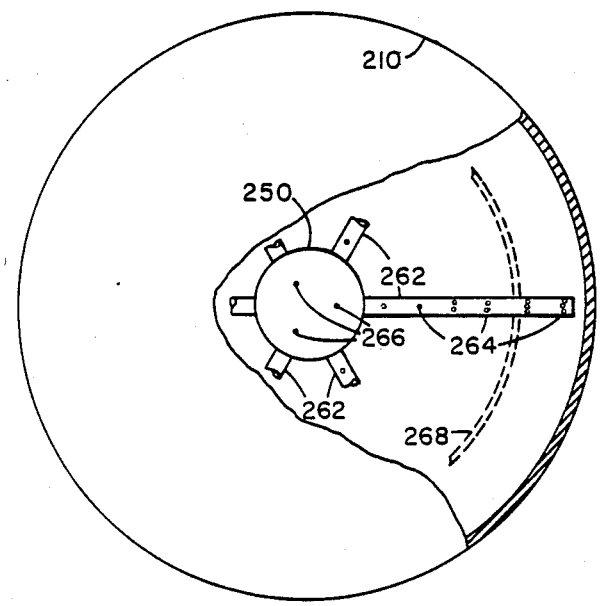
FIG. 6 is a bottom fragmentary view of the phase separator along lines 6—6 of FIG. 5.

The phase separator may be fabricated with 18-8 type 316 stainless steel or other suitable material of construction. The design shown in FIGS. 5 and 6 employs a 16-inch sched. 10S pipe for the separator, attached to a 8-inch sched. 20 inlet pipe with a 16-inch×8-inch reducer. The foraminous wall is drilled with 319 holes of 1-inch (26 mm) diameter placed on 44 mm equilateral pitch. The radial distributor pipes are 3-inch sched. 40S pipe drilled with 12-14 mm holes at spaced locations, as shown in FIG. 6. This phase separator is suitable for installation in an existing 2.286 m. inside diameter reactor shell 45 cm above the catalyst bed.

The number and size of gas escape ports in the phase separator determines the back pressure maintained. The total open cross-sectional area of the foraminous wall is ordinarily equal to about 25% to 150% of the upper separator cross-sectional area, immediately above throat section 241. Feedstreams having a very large volume fraction of gas require a relatively larger total escape port area to prevent unduly large pressure drop across the phase separator. By contrast, feedstreams having a major fraction of liquid may require a relatively smaller total escape port area to maintain adequate pressure drop across the liquid distribution systems.

Mixed feedstocks for treatment by the present process may include a relatively low volumetric ratio of gas to liquid. For instance, a relatively pure gaseous phase consisting essentially of pressurized hydrogen may be equal to or less than the liquid fraction. A more typical situation, however, would involve a larger gaseous phase wherein the reactant gas is lean, being mixed with inert and vaporized hydrocarbon. In such case the gas to liquid volume ratio would be greater than 1:1, say about 5:1 to 500:1 or greater. In some systems, it would be expected to operate at high temperatures, with 10 to 90 weight percent liquid in the feedstream due to vaporization of normally-liquid light components.

The gas escape and liquid distributor holes may be circular, triangular, rectangular, etc; and the liquid conduits may be in any suitable pattern or shape to achieve the uniform distribution.

In the multi-phase feedstock stream for a hydrocarbon conversion process, the liquid and vapor components can include a significant variety of chemical components. A petroleum distillate fraction may include relatively volative gasoline or kerosene range hydrocarbons present in the vapor phase as well as in the liquid phase. Heavier hydrocarbons in a distillate or heavy gas oil liquid phase may include high molecular weight aromatic or aliphatic molecules, waxy paraffinic components, etc.

The gaseous phase may include reactant gases, such as hydrogen, and inert gases, gases such as nitrogen, in admixture with low molecular weight hydrocarbon gases.

The multi-phase feedstock would ordinarily be introduced at a uniform reaction temperature, having passed through heat exchange or furnace equipment upstream from the reactor inlet.

What is claimed is:

1. A process for treating a hydrocarbon distillate stream under hydrodewaxing conditions in a fixed bed catalytic reactor having a porous bed of catalyst particles contained in a closed reactor shell, comprising the steps of
   (a) introducing a downwardly flowing mixed stream of vapor containing hydrogen gas and hydrocarbon liquid;
   (b) receiving said mixed stream in a phase separator and directing liquid uniformly onto the catalyst bed, said separator being disposed within the reactor shell between said inlet means and said porous catalytic bed;
   (c) removing a substantially gaseous phase outwardly from the separator through an upper foraminous wall having a series of gas outlets into an upper reactor portion wherein the gas outlets are sufficiently sized to provide pressure for effecting substantially uniform liquid distribution;
   (d) receiving a stream of substantially liquid phase in a lower portion of said phase separator;
   (e) dividing said liquid phase into a plurality of spaced-apart liquid streams directed toward the catalyst bed;
   (f) converting said hydrocarbon liquid by catalytic reaction with hydrogen in contact with the catalyst; and
   (g) recovering gaseous and liquid reaction products from the reactor.

2. The process of claim 1 wherein hydrocarbon distillate containing waxy component is selectively hydrocracked over a ZSM-5 catalyst to provide a dewaxed liquid product.

3. The process of claim 1 wherein said separator is attached to a top inlet portion of the reactor shell.

4. The process of claim 3 wherein said separator comprises
   an upper concentric gas escape separator portion having circumferential ports in spaced array and having a total open cross-sectional area adequate to permit gas escape at relatively low pressure drop; and
   a lower collector separator portion operatively connected below the gas escape portion for providing sufficient hydrostatic pressure to effect liquid flow.

5. The process of claim 4 comprising directing mixed gas and liquid feed downwardly past said gas escape ports toward said liquid collector portion, thereby preventing excess entrainment of liquid by gas flowing outwardly through said gas escape ports.

6. The process of claim 4 wherein the gas escape ports have a total open cross-sectional area equal to about 25 percent up to about 150 percent of the top inlet.

7. In the process of claim 6, said total port area being less than the inlet.

8. The process of claim 4 wherein the separator is installed by retrofit in a pre-existing vertical reactor shell having a top access and mounting ring.

9. The process of claim 8 wherein said upper separator portion has a cylindrical shape and an upper mounting flange adapted for engaging the reactor shell top mounting ring.

10. A process for hydrodewaxing a petroleum fraction in a fixed bed catalytic reactor having a porous bed of catalyst particles contained in a closed reactor shell, comprising the steps of:
   introducing a downwardly flowing mixed stream of gas and liquid reactants at a top reactor inlet;
   receiving said mixed stream in a phase separator and directing liquid onto the porous catalyst bed separator zone disposed within the reactor shell between the top inlet and the porous catalytic bed; said phase separator comprising an upper formaminous wall having a series of gas outlets, thereby removing a substantially-gaseous phase outwardly from the phase separator into an upper reactor portion, and a lower liquid distributor for receiving liquid and dividing the liquid into a plurality of spaced-apart liquid streams directed toward the porous catalyst bed;
   wherein the gas outlets are sufficiently sized to provide pressure on the liquid streams for effecting substantially uniform liquid distribution; and
   recovering gaseous and liquid reaction products from the reactor shell.

11. The process of claim 10 wherein the reactor shell is a vertical cylindrical pressure vessel having a center top mounting ring disposed in the upper reactor shell end, said top inlet comprising a vertical inlet pipe connected to said top mounting ring, and said phase separator being attached concentrically to the mounting ring below the inlet means.

12. The process of claim 11 wherein said lower liquid distributor comprises a plurality of radial pipes extending outwardly from the phase separator means toward the cylindrical reactor shell and having spaced holes to provide a substantially uniform liquid flow distribution pattern above the catalyst bed.

13. A process for treating a liquid petroleum fraction with a reactant gas in a fixed bed catalytic reactor having a porous bed of catalyst particles contained in a closed vertical reactor shell, comprising the steps of:
   introducing a downwardly flowing mixed stream of reactant gas and the liquid petroleum fraction at a top reactor inlet;
   receiving said mixed stream in a phase separator and directing liquid onto the porous catalyst bed separator zone disposed within the reactor shell between the top inlet and the porous catalytic bed; said phase separator comprising an upper foraminous wall having a series of gas outlets, said gas outlets having a total open cross-sectional area equal to about 25 to 150 percent of the top inlet area, thereby removing a substantially-gaseous phase outwardly from the phase separator into an upper reactor portion; and a lower liquid distributor for receiving liquid and dividing the liquid into a plurality of spaced-apart liquid stream directed toward the porous catalyst bed; having a center top mounting ring disposed in the upper reactor shell end, said top inlet comprising a vertical inlet pipe connected to said top mounting ring, and said phase separator being attached concentrically to the mounting ring below the inlet means; and
   recovering gaseous and liquid reaction products from the reactor shell.

* * * * *